(12) United States Patent
Louie et al.

(10) Patent No.: US 9,833,981 B2
(45) Date of Patent: Dec. 5, 2017

(54) VACUUM BAG SEALING SYSTEM AND METHOD FOR COMPOSITE PARTS

(71) Applicant: The Boeing Company, Chicago, IL (US)

(72) Inventors: Michael Louie, Renton, WA (US); Kenneth M. Dull, Puyallup, WA (US); Timothy D. Aquino, Olympia, WA (US)

(73) Assignee: The Boeing Company, Chicago, IL (US)

( * ) Notice: Subject to any disclaimer, the term of this patent is extended or adjusted under 35 U.S.C. 154(b) by 534 days.

(21) Appl. No.: 14/153,797

(22) Filed: Jan. 13, 2014

(65) Prior Publication Data

US 2015/0107775 A1    Apr. 23, 2015

Related U.S. Application Data

(60) Provisional application No. 61/894,175, filed on Oct. 22, 2013.

(51) Int. Cl.
| | |
|---|---|
| *B32B 37/10* | (2006.01) |
| *B29C 70/44* | (2006.01) |
| *B65D 81/20* | (2006.01) |
| *B65D 33/25* | (2006.01) |

(52) U.S. Cl.
CPC .......... *B32B 37/1018* (2013.01); *B29C 70/44* (2013.01); *B65D 33/2508* (2013.01); *B65D 33/2541* (2013.01); *B65D 33/2558* (2013.01); *B65D 33/2566* (2013.01); *B65D 81/2023* (2013.01); *B32B 2309/68* (2013.01)

(58) Field of Classification Search
CPC . B29C 70/44; B32B 2309/68; B32B 37/1018; B65D 33/2541
See application file for complete search history.

(56) References Cited

U.S. PATENT DOCUMENTS

| | | | |
|---|---|---|---|
| 4,287,015 A | 9/1981 | Danner, Jr. | |
| 6,851,945 B2 | 2/2005 | Potter et al. | |
| 2006/0008187 A1* | 1/2006 | Armstrong | B65D 33/2591 383/103 |
| 2010/0205909 A1* | 8/2010 | Zimmerman | B65D 33/20 53/434 |
| 2011/0110612 A1 | 5/2011 | Nelson | |

FOREIGN PATENT DOCUMENTS

FR    2 905 115 A1    2/2008

OTHER PUBLICATIONS

Zipper Storage Bags, http://en.wikipedia.org/wiki/Zipper_storage_bag (2014).
International Search Report and Written Opinion, PCT/US2014/053838 (dated 2014).
Torr Technologies, Inc.: "Envelope Bags," XP002732500 (2012).
Easy Composite: "Beginners' Guide to Out-of-Autoclave Prepreg Carbon Fibre," XP002732501 (2013).

* cited by examiner

*Primary Examiner* — Christopher Schatz
(74) *Attorney, Agent, or Firm* — Walters & Wasylyna LLC

(57) ABSTRACT

A vacuum bag sealing system may include a composite bagging sheet, and at least one interlocking strip connected to a surface of the composite bagging sheet, wherein the interlocking strip is configured to join a first section of the composite bagging sheet to a second section of the composite bagging sheet to form a sealed vacuum bag.

18 Claims, 9 Drawing Sheets

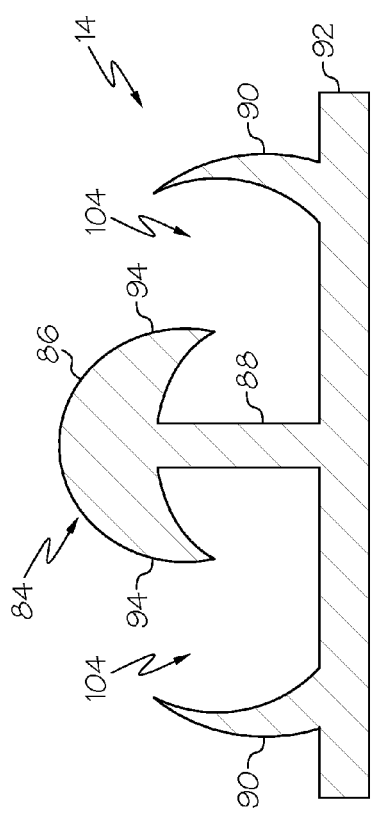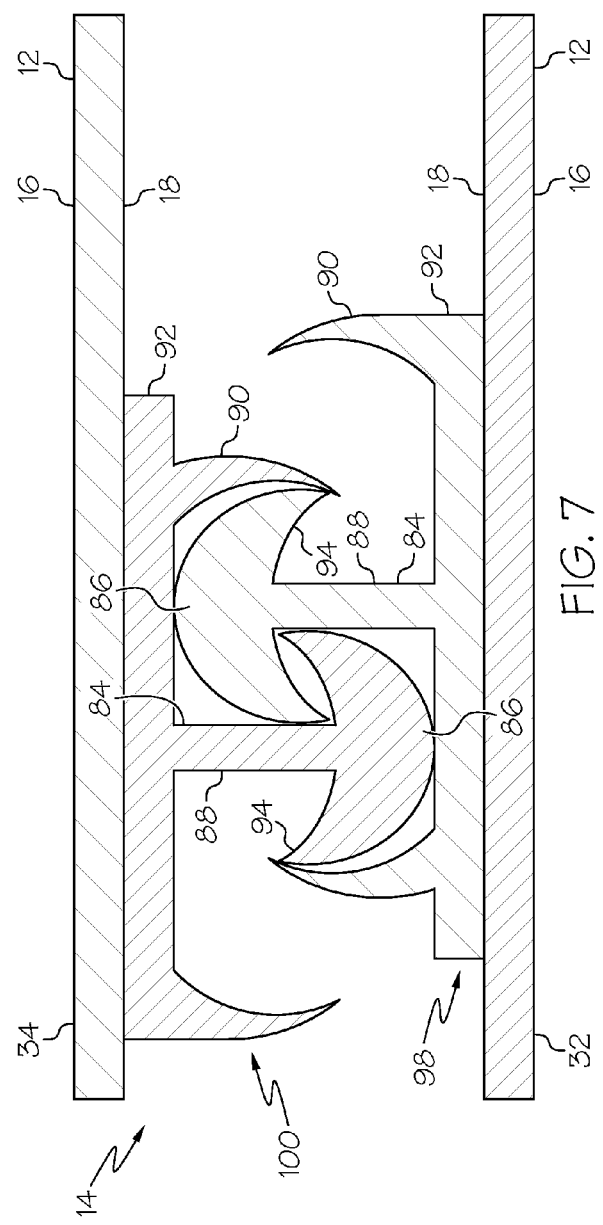

VACUUM BAG SEALING SYSTEM AND METHOD FOR COMPOSITE PARTS

PRIORITY

This application claims priority from U.S. Ser. No. 61/894,175 filed on Oct. 22, 2013, the entire contents of which are incorporated herein by reference.

FIELD

The present disclosure is generally related to vacuum bags suitable for sealing a composite part on a curing tool and, more particularly, to a vacuum bag sealing system for sealing a composite part on a curing tool while curing the composite part.

BACKGROUND

Composite parts are used for a variety of applications. For example many parts of an aircraft such as wing planks, vertical and horizontal stabilizer skins, fuselage panels, and various other components are made of composite structures. The composite parts are typically formed on a mold that is mounted on a base plate. Layers of composite material are impregnated with uncured resin and then laid up over the mold. A vacuum bag is then placed over the uncured composite material and sealed to the plate about the periphery. To cure the part, a vacuum is drawn from between the vacuum bag and the base plate and the entire assembly is placed in an autoclave where the temperature and pressure are raised to cure the resin. After curing, the assembly is returned to room temperature and the vacuum bag is removed so that the cured composite part may be removed from the mold.

Construction of the vacuum bag may be time consuming, expensive, and unreliable unless skilled personnel are assigned to the task. Requiring an airtight seal around the periphery of the composite part in order to draw and maintain a vacuum pressure further complicates the task. Requiring the fastening contact to be airtight may limit the types of fastening and the types of vacuum bags that may be used and also requires that the fastening construction be done with careful skill.

Accordingly, those skilled in the art continue with research and development efforts in the field of vacuum bag sealing.

SUMMARY

In one embodiment, the disclosed vacuum bag sealing system may include a composite bagging sheet, and at least one interlocking strip connected to a surface of the composite bagging sheet, wherein the interlocking strip is configured to join a first section of the composite bagging sheet to a second section of the composite bagging sheet to form a sealed vacuum bag.

In another embodiment, the disclosed vacuum bag sealing system may include at least one first interlocking strip connected to a composite bagging sheet, and at least one second interlocking strip, wherein the first interlocking strip is configured to join the composite bagging sheet to the second interlocking strip. The composite bagging sheet includes a first section and a second section, the first interlocking strip is connected to the first section and the second interlocking strip is connected to the second section, and the first section and the second section are joined along the first interlocking strip and the second interlocking strip to form a sealed vacuum bag.

In another embodiment, the disclosed vacuum bag sealing system may include at least one first interlocking strip connected a composite bagging sheet, and at least one second interlocking strip, wherein the first interlocking strip is configured to join the composite bagging sheet to the second interlocking strip. The second interlocking strip is connected to a second composite bagging sheet, and the first composite bagging sheet and the second composite bagging sheet are joined along the first interlocking strip and the second interlocking strip to form a sealed vacuum bag.

In another embodiment, the disclosed vacuum bag sealing system may include at least one first interlocking strip connected to a composite bagging sheet, and at least one second interlocking strip, wherein the first interlocking strip is configured to join the composite bagging sheet to the second interlocking strip. The second interlocking strip is connected to a surface of a composite forming tool, and the composite bagging sheet and the forming tool are joined along the first interlocking strip and the second interlocking strip to form a sealed vacuum bag.

In yet another embodiment, disclosed is a method for vacuum bag sealing, the method may include the steps of: (1) providing a composite bagging sheet, the composite bagging sheet including a first section and a second section; (2) providing at least one interlocking strip connected to a surface of the composite bagging sheet; (3) providing a mold; (4) placing a composite part on the mold; and (5) joining the first section to the second section along the interlocking strip to form a sealed vacuum bag around the mold and the composite part.

Other embodiments of the disclosed vacuum bag sealing system and method will become apparent from the following detailed description, the accompanying drawings and the appended claims.

BRIEF DESCRIPTION OF THE DRAWINGS

FIG. 6 is a side elevational view, in section, of one embodiment of the interlocking strip of the disclosed vacuum bag sealing system;

FIG. 7 is a side elevational view, in section, of interlocked sections of the interlocking strip of FIG. 6;

DETAILED DESCRIPTION

Figure 1:
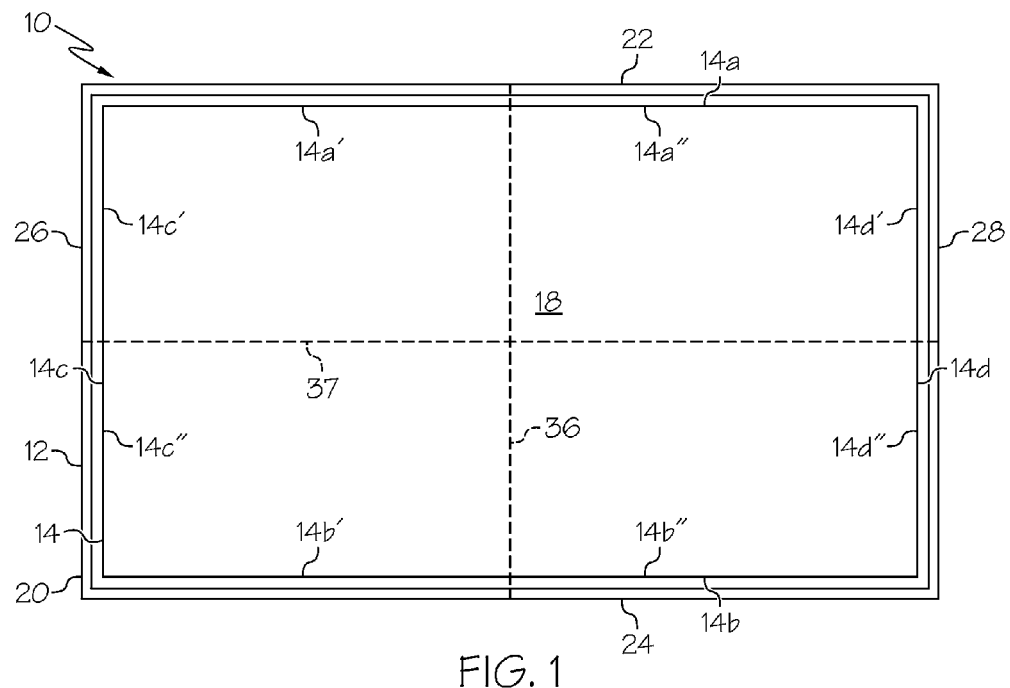
FIG. 1 is a top plan view of one embodiment of the disclosed vacuum bag sealing system.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
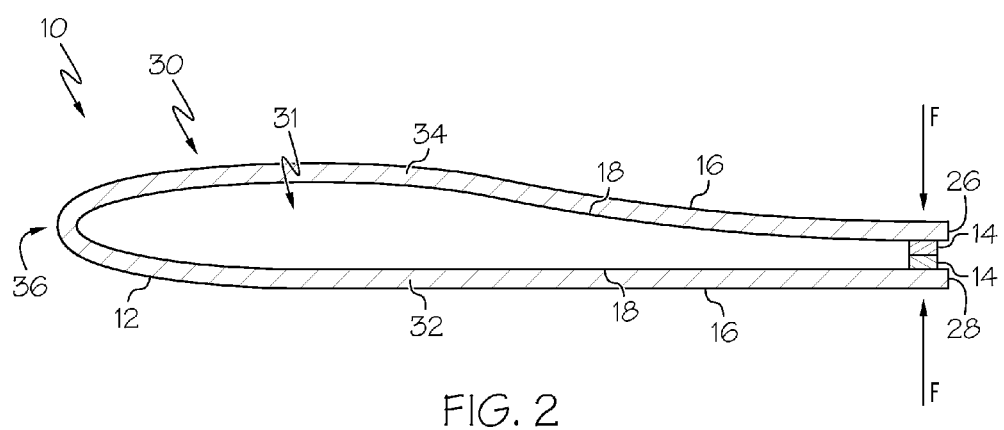
FIG. 2 is a side elevational view, in section, of one embodiment of the vacuum bag formed by the disclosed vacuum bag sealing system.

Referring to FIGS. 1 and 2, one embodiment of the disclosed vacuum bag sealing system, generally designated 10, for composite parts may include a composite bagging sheet 12 having one or more interlocking strips 14. The composite bagging sheet 12 may be a crinkled bag film, nylon, a polymeric material, silicone rubber, or any other type of material that is suitable for vacuum sealing applications. The composite bagging sheet 12 may include a first surface 16 (e.g., an exposed surface), a second surface 18 (e.g., a sealing surface) opposite the first surface 16, and a perimeter edge 20.

As illustrated in FIG. 1, in an example construction, the composite bagging sheet 12 may be generally elongated and rectangular in shape having a first edge 22 (e.g., a first lengthwise edge), a second edge 24 (e.g., a second lengthwise edge) laterally spaced apart from the first edge 22, a third edge 26 (e.g., a first widthwise edge) extending between the first edge 22 and the second edge 24, and a fourth edge 28 (e.g., a second widthwise edge) extending between the first edge 22 and the second edge 24 and longitudinally spaced apart from the third edge 26. In other example constructions, the composite bagging sheet 12 may have other shapes and configurations, such as circular, ovular, or square.

One or more interlocking strips 14 may be connected to the second surface 18 of the composite bagging sheet 12. The interlocking strip 14 may be fabricated from any material suitable for high temperatures (e.g., up to approximately 850° C.). The interlocking strips 14 may be bonded to the composite bagging sheet 12 by any suitable method. For example, the interlocking strips 14 may be heat welded to the second surface 18 of the composite bagging sheet 12. As another example, the interlocking strips 14 may be adhered to the second surface 18 of the composite bagging sheet 12, such as with sealing tape or an adhesive compound.

The interlocking strip 14 may be positioned proximate (e.g., at or near) the perimeter edge 20 of the composite bagging sheet 12. Alternatively, the interlocking strip 14 may be spaced away from the perimeter edge 20 of the composite bagging sheet 12. Alternatively, the interlocking strip 14 may extend beyond the perimeter edge 20 of the composite bagging sheet 12. In an example construction, the interlocking strip 14 may extend around a portion of the perimeter edge 20 of the composite bagging sheet 12. In another example construction, the interlocking strip 14 may extend around the entire perimeter edge 20 of the composite bagging sheet 12.

For example, a single interlocking strip 14 may extend around the entire perimeter edge 20 of the composite bagging sheet 12. As another example, one or more first interlocking strips 14a may be positioned proximate the first edge 22, one or more second interlocking strips 14b may be positioned proximate the second edge 24, one or more third interlocking strips 14c may be positioned proximate the third edge 26, and one or more fourth interlocking strips 14d may be positioned proximate the fourth edge 28. If more than one interlocking strip 14 is used, all intersecting end edges of adjacent interlocking strips 14 may be bonded or otherwise connected together to form a substantially airtight seal between adjacent interlocking strips 14.

Referring to FIG. 2, the interlocking strip 14 may be configured to join sections of the composite bagging sheet 12 together to form a substantially airtight sealed vacuum bag 30. For example, the interlocking strip 14 may include a cross-sectional shape configured to interlock (e.g., snap lock) any portion of the interlocking strip 14 to any other portion of the interlocking strip 14. The vacuum bag 30 formed by joining sections of the composite bagging sheet 12 may include an internal volume 31 suitable to contain a composite forming tool 40 (FIG. 3).

For example, the vacuum bag 30 may be formed by folding the vacuum bag sheet 12 about the first edge 22 and the second edge 24 such that the second surface 18 of a first section 32 of the vacuum bag sheet 12 faces the second surface 18 of a second section 34 of the vacuum bag sheet 12 (e.g., folding the vacuum bag sheet 12 in half laterally). The third interlocking strip 14c may engage the fourth interlocking strip 14d. A first section 14a' of the first interlocking strip 14a (e.g., a section of the first interlocking strip 14a extending from a fold line 36 (FIG. 1) to the third interlocking strip 14c) may engage a second section 14a" of the first interlocking strip 14a (e.g., a section of the first interlocking strip 14a extending from the fold line 36 to the fourth interlocking strip 14d). A first section 14b' of the second interlocking strip 14b (e.g., a section of the second interlocking strip 14b extending from the fold line 36 to the third interlocking strip 14c) may engage a second section 14b" of the second interlocking strip 14b (e.g., a section of the second interlocking strip 14b extending from the fold line 36 to the fourth interlocking strip 14d). Upon a compression force F being applied to the engaged interlocking strips 14 (e.g., engaged third interlocking strip 14c and fourth interlocking strip 14d, engaged sections of the first interlocking strip 14a, and engaged sections of the second interlocking strip 14b), the interlocking strips 14 may lock together to form a substantially airtight seal around the perimeter edge 20 of the composite bagging sheet 12.

As another example, the vacuum bag 30 may be formed by folding the vacuum bag sheet 12 about the third edge 26 and the fourth edge 28 such that the second surface 18 of a first section 32 of the vacuum bag sheet 12 faces the second surface 18 of a second section 34 of the vacuum bag sheet 12 (e.g., folding the vacuum bag sheet 12 in half longitudinally) (not shown). The first interlocking strip 14a may engage the second interlocking strip 14b. A first section 14c' of the third interlocking strip 14c (e.g., a section of the third interlocking strip 14c extending from a fold line 37 to the first interlocking strip 14a) may engage a second section 14c" of the third interlocking strip 14c (e.g., a section of the third interlocking strip 14c extending from the fold line to the second interlocking strip 14b). A first section 14d' of the fourth interlocking strip 14d (e.g., a section of the fourth interlocking strip 14d extending from the fold line to the first interlocking strip 14a) may engage a second section 14d" of the fourth interlocking strip 14d (e.g., a section of the fourth interlocking strip 14d extending from the fold line to the second interlocking strip 14b). Upon a compression force F being applied to the engaged interlocking strips 14 (e.g., engaged first interlocking strip 14a and second interlocking strip 14b, engaged sections of the third interlocking strip 14c, and engaged sections of the fourth interlocking strip 14d), the interlocking strips 14 may lock together to form a substantially airtight seal around the perimeter edge 20 of the composite bagging sheet 12.

Figure 3:
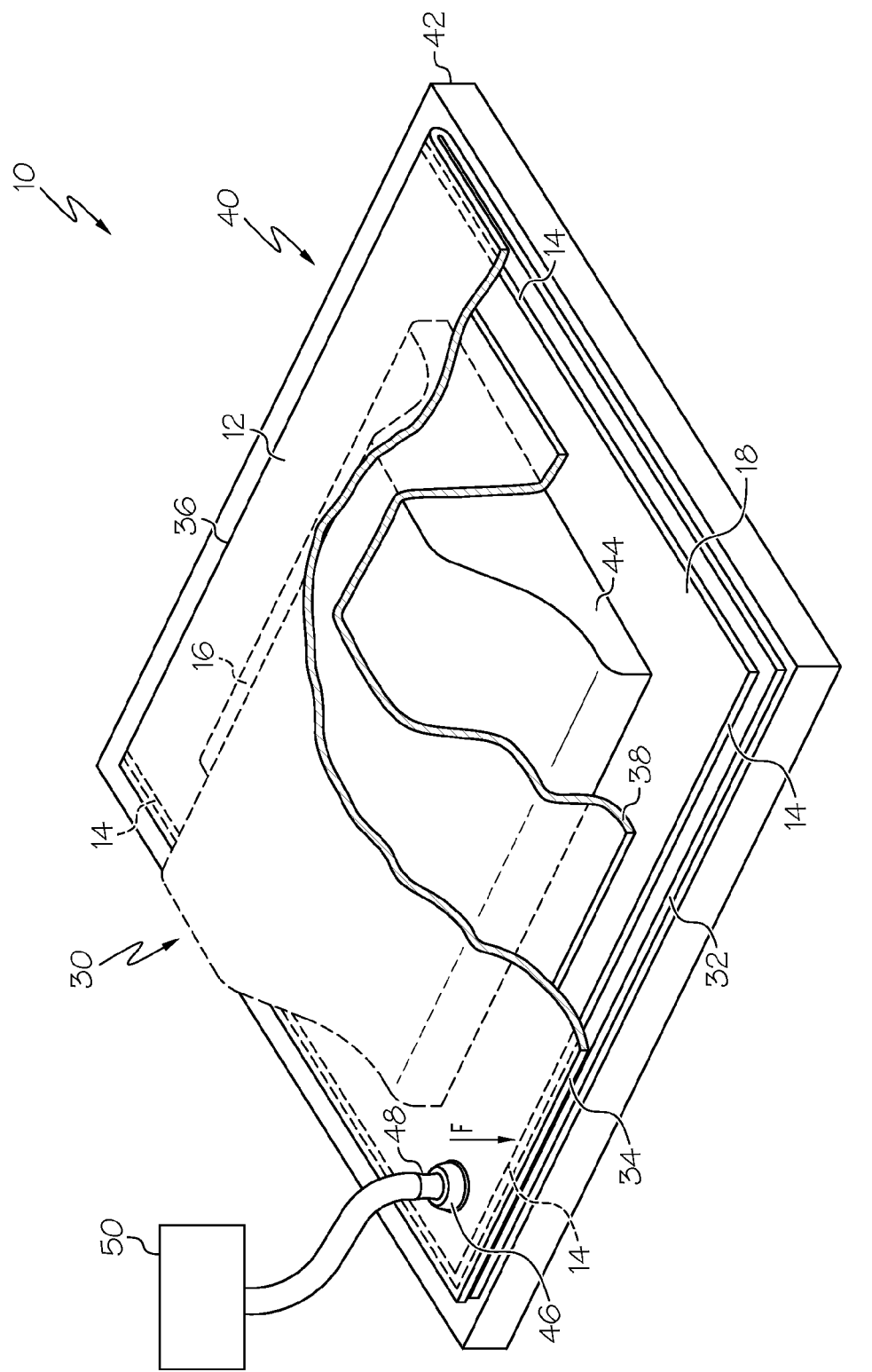
FIG. 3 is a broken away perspective view of a composite part forming tool utilizing the disclosed vacuum bag sealing system.

FIG. 3 illustrates a composite part 38 formed on a forming tool 40 utilizing the disclosed vacuum bag sealing system 10. The forming tool 40 may include a solid surface in the form of a base plate 42. Although the base plate 42 is shown having a flat rectangular shape, those skilled in the art will appreciate that the base plate 42 may have a complex, three-dimensional shape and/or contour.

The composite bagging sheet 12 may be laid over the base plate 42. For example, the first section 32 of the composite bagging sheet 12 may be placed over the base plate 42 such that the second surface 18 faces away from the base plate 42.

A mold 44 may be mounted on the base plate 42 over the second section 34 of the composite bagging sheet 12. The mold 42 may include any regular or irregular shape having the shape of the composite part 38 to be formed. For example, the mold 44 is shown having a contoured surface incorporating the desired shape of the composite part 38 to be formed.

The composite part 38 may be formed from any suitable composite material, for example sheets or plies of woven or unidirectional filamentary material. The plies of composite material may be laid over the mold 44. The plies of composite material may generally be pre-impregnated with an uncured resin and then placed on the mold 44.

Optionally, bleeder and/or breather cloth (not shown) may be used as required.

The composite bagging sheet 12 may be folded (e.g., about the fold line 36, as shown in FIG. 1) to place the second section 34 of the composite bagging sheet 12 over the mold 44 and the plies of composite material forming the composite part 38 (e.g., with the second surface 18 facing the base plate 42). A portion of the interlocking strip 14 disposed on the second surface 18 of the of the composite bagging sheet 12 may be aligned with and engage a portion of the interlocking strip 14 disposed on the second surface 18 of the second section 34 to form the vacuum bag 30 having a substantially airtight seal (e.g., in response to the compression force F).

A vacuum pressure may be drawn on the plies of composite material forming the composite part 38 and the mold 44 with the aid of the sealed vacuum bag 30. For example, a vacuum probe base 46 may be placed inside the vacuum bag 30 (e.g., positioned between the first section 32 and the second section 34 of the composite bagging sheet 12 prior to joining the interlocking strip 14). A small aperture (not shown) may be cut in the composite bag material 12 and aligned with the vacuum probe base 46. A vacuum fitting 48 may be connected to the vacuum probe base 46. The vacuum fitting 48 may include a gasket configured to seal the composite bagging sheet 12 around the connection of the vacuum fitting 48 and the vacuum probe base 46. The vacuum fitting 48 may be connected to a vacuum source 50 configured to draw the vacuum pressure on the plies of composite material forming the composite part 38 and the mold 44 sealed within the vacuum bag 30.

An entire assembly, including the mold 42, the composite part 38, and the vacuum bag 30 may then placed in an autoclave or oven in which the layup is cured through the application of further pressure at an elevated temperature. After removal from the autoclave and cooling down to room temperature, the vacuum bag 30 may be unsealed (e.g., the first section 32 may be removed from the second section 34) and the formed composite part 38 may be removed from the mold 44.

Optionally, at least one lengthwise pleat (not shown) may be formed in the composite bagging sheet 2 between the perimeter edges 20 (e.g., between the first edge 22 and the second edge 24) according to the knowledge of those skilled in the art. One or multiple lengthwise pleats may be disposed in generally parallel relationship with respect to each other and a longitudinal axis of the composite bagging sheet 12. Those skilled in the art will appreciated that the presence of one or more pleats in the composite bagging sheet 12 may enable steering of the vacuum bag 30 around a curvature in the composite part 38 or along a curved track (not shown) as the vacuum bag 30 is applied over the composite part 38.

Those skilled in the art will appreciate that depending upon the material of the composite bagging sheet 12, the composite bagging sheet 12 may be reused to form a vacuum bag 30 for additional composite forming processes. Additionally, the vacuum bag 30 formed by the composite bagging sheet 12 and the interlocking strip 14 may be suitable for a variety of alternative sealing applications.

Figure 4:
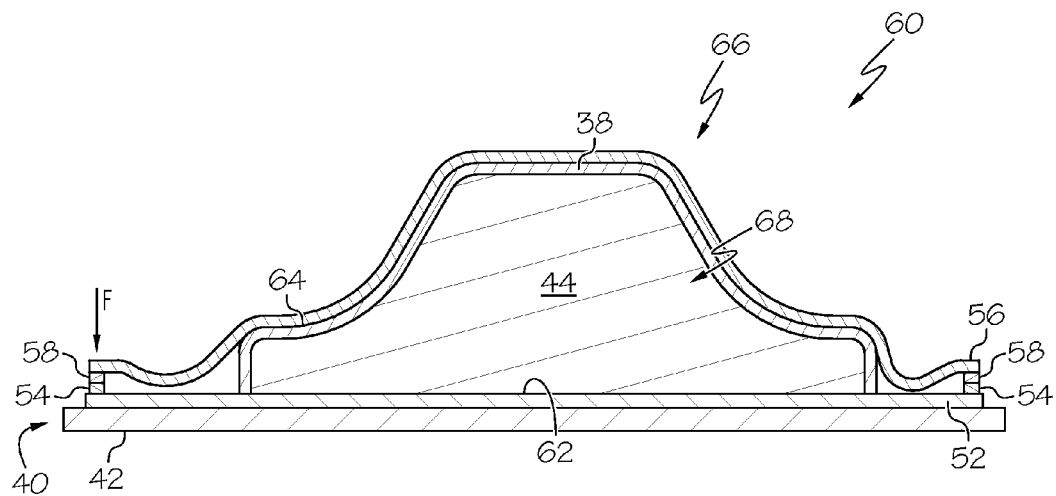
FIG. 4 is a side elevation view, in section, of a composite part forming tool utilizing another embodiment of the disclosed vacuum bag sealing system.

Referring to FIG. 4, another embodiment of the disclosed vacuum bag sealing system, generally designated 60, may include a first composite bagging sheet 52 having an interlocking strip 54 and a second composite bagging sheet 56 having an interlocking strip 58. Each composite bagging sheet 52, 56 may be substantially similar to the composite bagging sheet 12 described above (FIG. 1). Each interlocking strip 54, 58 may be substantially similar to the interlocking strip 14 described herein (FIG. 6). For example, the first composite bagging sheet 52 may include one or more first interlocking strips 54 bonded to a second surface 62 (e.g., a sealing surface) proximate a perimeter edge and the second composite bagging sheet 56 may include one or more second interlocking strips 58 bonded to a second surface 64 (e.g., a sealing surface) proximate a perimeter edge. The first composite bagging sheet 52 and the second composite bagging sheet 56 may be substantially equal in shape and dimensions.

As illustrated in FIG. 4, the composite part 38 may be formed on the forming tool 40 utilizing the disclosed vacuum bag sealing system 60. The forming tool 40 may include the base plate 42 and the mold 44. The first composite bagging sheet 52 may be laid over the base plate 42 with the second surface 62 facing away from the base plate 42.

The mold 44 may be mounted on the base plate 42 over the first composite bagging sheet 52. The plies of composite material forming the composite part 38 may be laid over the mold 44. Optionally, bleeder and/or breather cloth (not shown) may be used as required.

The second composite bagging sheet 56 may be placed over the mold 44 and the plies of composite material forming the composite part 38. The interlocking strip 54 of the first composite bagging sheet 52 may be aligned with and engage the interlocking strip 58 of the second composite bagging sheet 56 to form a vacuum bag 66 defining an internal volume 68 and having a substantially airtight seal (e.g., in response to the compression force F).

A vacuum pressure may be drawn on the plies of composite material forming the composite part 38 and the mold 44 with the aid of the sealed vacuum bag 66. An entire assembly, including the mold 42, the composite part 38, and the vacuum bag 66 may then be placed in an autoclave in which the layup is cured through the application of further pressure at an elevated temperature. After removal from the autoclave and cooling down to room temperature, the vacuum bag 66 may be unsealed (e.g., the second composite bagging sheet 64 may be removed from the first composite bagging sheet 62) and the formed composite part 38 may be removed from the mold 44.

Figure 5:
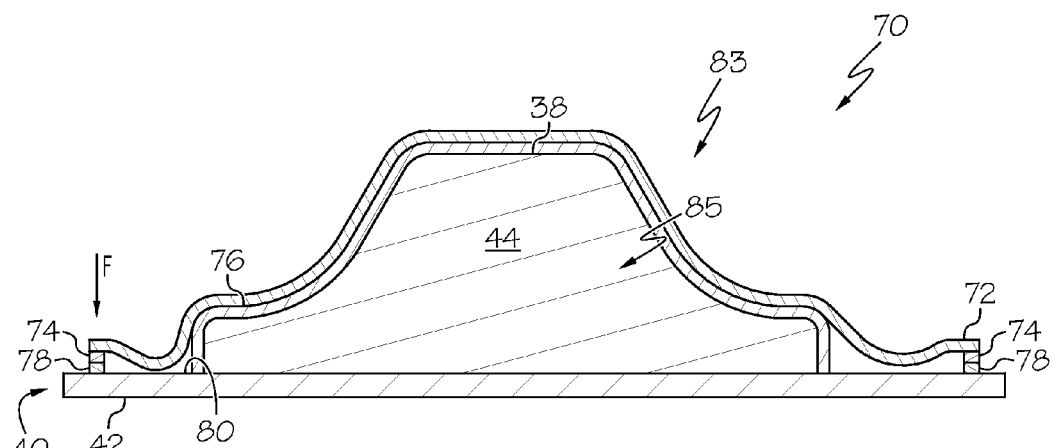
FIG. 5 is a side elevation view, in section, of a composite part forming tool utilizing another embodiment of the disclosed vacuum bag sealing system.

Referring to FIG. 5, another embodiment of the disclosed vacuum bag sealing system, generally designated 70, may include a composite bagging sheet 72 having an interlocking strip 74. The composite bagging sheet 72 may be substantially similar to the composite bagging sheet 12 described above (FIG. 1). For example, the composite bagging sheet 72 may include one or more interlocking strips 74 bonded to a second surface 76 (e.g., a sealing surface) proximate a perimeter edge. The interlocking strip 74 may be substantially similar to the interlocking strip 14 described herein (FIG. 6).

As illustrated in FIG. 5, the composite part 38 may be formed on the forming tool 40 utilizing the disclosed vacuum bag sealing system 70. The forming tool 40 may include the base plate 42 and the mold 44. The mold 44 may be mounted on the base plate 42. The plies of composite material forming the composite part 38 may be laid over the mold 44. Optionally, bleeder and/or breather cloth (not shown) may be used as required.

One or more second interlocking strips 78 may be bonded to a surface 80 of the base plate 42. The second interlocking strip 78 may be substantially similar to the interlocking strip 14 described herein (FIG. 6). For example, the second interlocking strip 78 may be bonded to the surface 80 of the base plate 42 proximate a perimeter edge 82 of the base plate 42. The surface 80 of the base plate 42 to which the second interlocking strip 78 is bonded may be flat or contoured.

The composite bagging sheet 72 may be placed over the mold 44 and the plies of composite material forming the composite part 38. The interlocking strip 74 of the composite bagging sheet 72 may be aligned with and engage the second interlocking strip 78 bonded to the surface 80 of the base plate 42 to form a vacuum bag 83 defining an internal volume 85 and having a substantially airtight seal (e.g., in response to the compression force F).

A vacuum pressure may be drawn on the plies of composite material forming the composite part 38 and the mold 44 with the aid of the sealed vacuum bag 83. An entire assembly, including the mold 42, the composite part 38, and the vacuum bag 83 may then be placed in an autoclave in which the layup is cured through the application of further pressure at an elevated temperature. After removal from the autoclave and cooling down to room temperature, the vacuum bag 83 may be unsealed (e.g., the composite bagging sheet 72 may be removed from the base plate 42) and the formed composite part 38 may be removed from the mold 44.

Referring to FIGS. 6 and 7, the interlocking strip 14 may include a cross-sectional shape configured to join a section of the interlocking strip 14 with another section of interlocking strip 14 (e.g., the third interlocking strip 14c joined to the fourth interlocking strip 14d or a first portion of the first interlocking strip 14a joined to a second portion of the first interlocking strip 14a, as shown in FIG. 1). The interlocking strip 14 may include any cross-sectional shape or configuration suitable to allow opposed sections of the interlocking strip 14 (e.g., on opposite sides of the composite bagging sheet 12 or the same side of the composite bagging sheet 12) to engage and couple together or interlock and form a substantially airtight seal between interlocked sections of the interlocking strip 14 and form the vacuum bag 30.

For example, as illustrated in FIG. 6, one embodiment of the interlocking strip 14 may include an elongated coupling structure 84 extending substantially between perimeter edges 20 of the composite bagging sheet 12 (FIG. 1). The coupling structure 84 may be configured so that once coupled together with another coupling structure 84, the interlocking strip 14 cannot be easily pulled apart or uncoupled, thus forming a substantially airtight seal.

In an example construction, the coupling structure 84 may include a head 86 and a stem 88. The stem 88 may extend outward from a base 92. The base 92 may be bonded (e.g., heat welded or adhered) to the second surface 18 of the composite bagging sheet 12 (or the surface 80 of the base plate 42) about a bonding surface 102. A free end of the stem 88 may define the head 86. The head 86 may include at least one outwardly extending hook 94, for example, the head 86 may include a pair of oppositely disposed and outwardly extending hooks 94. For example, the hook 94 may extend substantially perpendicularly from the free end of the stem 88. As another example, the hook 94 may extend at a non-zero angle other than perpendicular from the free end of the stem 88.

As illustrated in FIG. 7, the hook 94 of a first section 98 of the interlocking strip 14 may be configured to engage and interlock with corresponding hook 94 of a second section 100 of the interlocking strip 14. For example and in reference to FIG. 1, the hook 94 of the third interlocking strip 14c (e.g., the first section 98) may cooperate and interlock with the hook 94 of the fourth interlocking strip 14d (e.g., the second section 100) when the composite bagging sheet 12 is folded about the fold line 36. As another example, the hook 94 of the first section 14a' of the first interlocking strip 14a (e.g., the first section 98) may cooperate and interlock with hook 94 of the second section 14a" of the first interlocking strip 14a (e.g., the second section 100) when the composite bagging sheet 12 is folded about the fold line 36.

Optionally, one or more ribs 90 may extend adjacent to the stem 88. The stem 88 and the ribs 90 may extend outward from the common base 92. The ribs 90 may be configured to engage (e.g., contact) a hook 94 of the head 86 opposite the hook 94 engaged with a hook 94 of a cooperatively coupled head 86. For example, the rib 90 and the coupling structure 84 may form a mouth 104 configured to receive the head 86 of a cooperatively opposed coupling structure 84.

Figure 8:
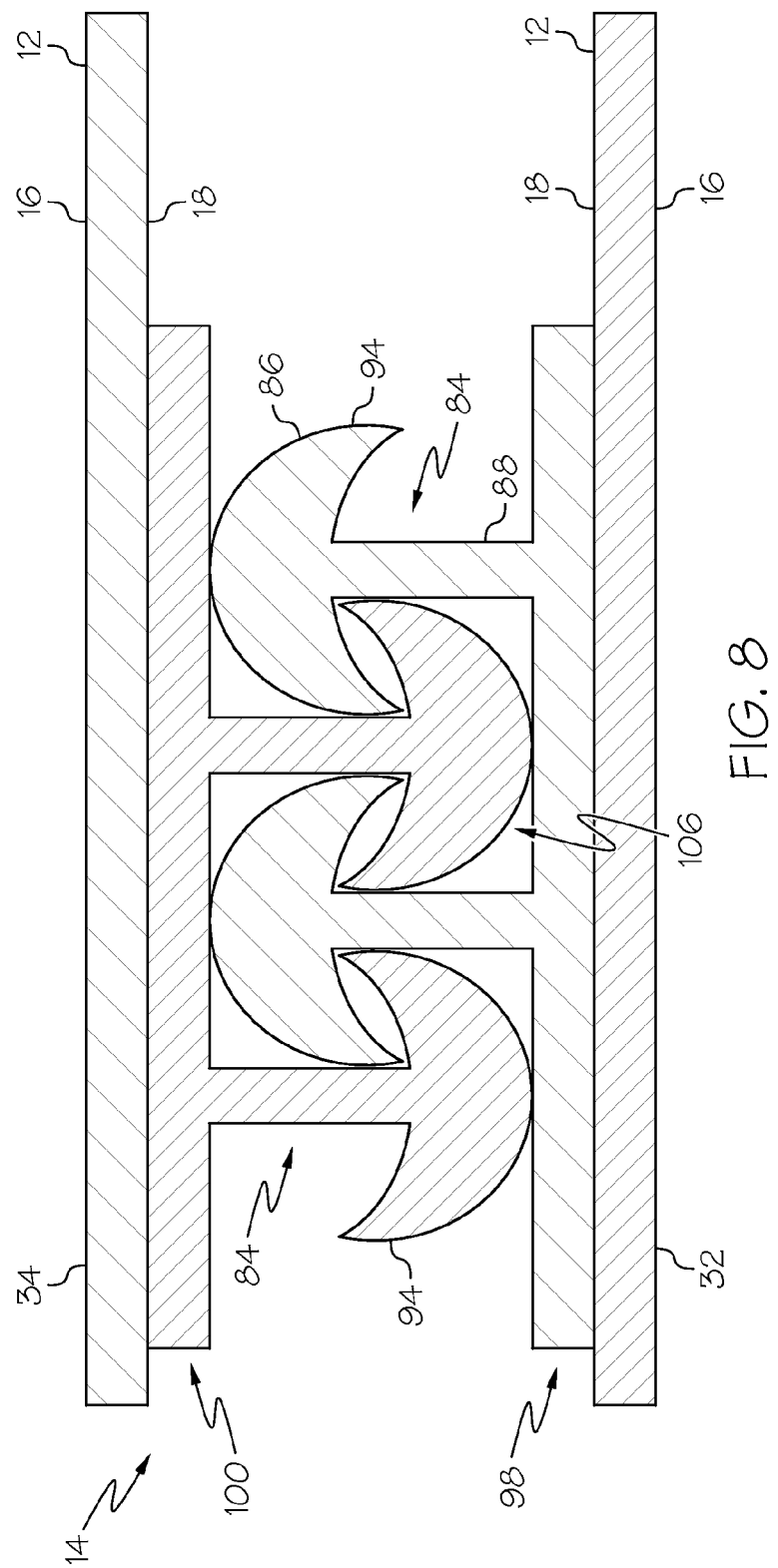
FIG. 8 is a side elevational view, in section of another embodiment of the interlocking strip of the disclosed vacuum bag sealing system.

Referring to FIG. 8, another embodiment of the interlocking strip 14 may include more than one elongated coupling structure 84 extending substantially between perimeter edges 20 of the composite bagging sheet 12 (FIG. 1). Adjacent coupling structures 84 may be substantially parallel and spaced apart a suitable distance to receive the head 86 of a cooperatively opposed coupling structure 84. For example, adjacent coupling structures 84 of the first section 98 of the interlocking strip 14 may define a groove 106 configured to receive the head 86 of a cooperatively opposed coupling structure 84 of the second section 100 of the interlocking strip 14. Thus, the hooks 94 of adjacent coupling structures 84 (e.g., pairs of facing hooks 94) of the first section 98 of the interlocking strip 14 may engage and interlock with opposed hooks 94 of the head 86 of the cooperatively opposed coupling structure 84 of the second section 100 of the interlocking strip 14.

In another embodiment, the interlocking strip 14 may include an elongated, generally inverted L-shaped coupling structure (not shown) extending substantially between perimeter edges 20 of the composite bagging sheet 12. In another embodiment, the interlocking strip 14 may include an elongated, generally inverted J-shaped coupling structure (not shown) extending substantially between perimeter edges 20 of the composite bagging sheet 12. In yet another embodiment, the interlocking strip 14 may include an elongated, generally T-shaped coupling structure (not shown) extending substantially between perimeter edges 20 of the composite bagging sheet 12. Other configurations of the interlocking strip 14 and shapes (e.g., cross-sectional shapes) of the coupling structure 84 are also contemplated.

Those skilled in the art will appreciate that the configuration of the interlocking strip 14 (e.g., the shape of the coupling structure 84) may be the same or may vary along the length of one or more of the perimeter edges 20 of the composite bagging sheet 12 to facilitate connection with another interlocking strip 14. For example and in reference to FIG. 1, the third interlocking strip 14c may include a configuration suitable to cooperate and interlock with a configuration of the fourth interlocking strip 14d when the composite bagging sheet 12 is folded about the fold line 36. As another example, the first interlocking strip 14 may include the first section 14a' having a configuration suitable to cooperate and interlock with a configuration of the second section 14a" when the composite bagging sheet 12 is folded about the fold line 36, where the configuration of the first section 14a" is different than the configuration of the second section 14a".

In an example implementation, a manufacturer of the composite bagging sheet 12 may bond the interlocking strip 14 to the composite bagging sheet 12 (FIG. 1). In another example implementation, a manufacturer of the composite part 38 (FIG. 3) may bond the interlocking strip 14 to the composite bagging sheet 12 and/or the forming tool 40 (e.g., the surface 80 of the base plate 42, as illustrated in FIG. 5) prior to a vacuum bagging composite manufacturing process. For example, the interlocking strip 14 may take the form of a dispensable elongated strip including the base 92 and the coupling structure 84 (FIG. 6), which can be cut to length and connected directly to an appropriate location on the composite bagging sheet 12 and/or the forming tool 40.

Figure 9:
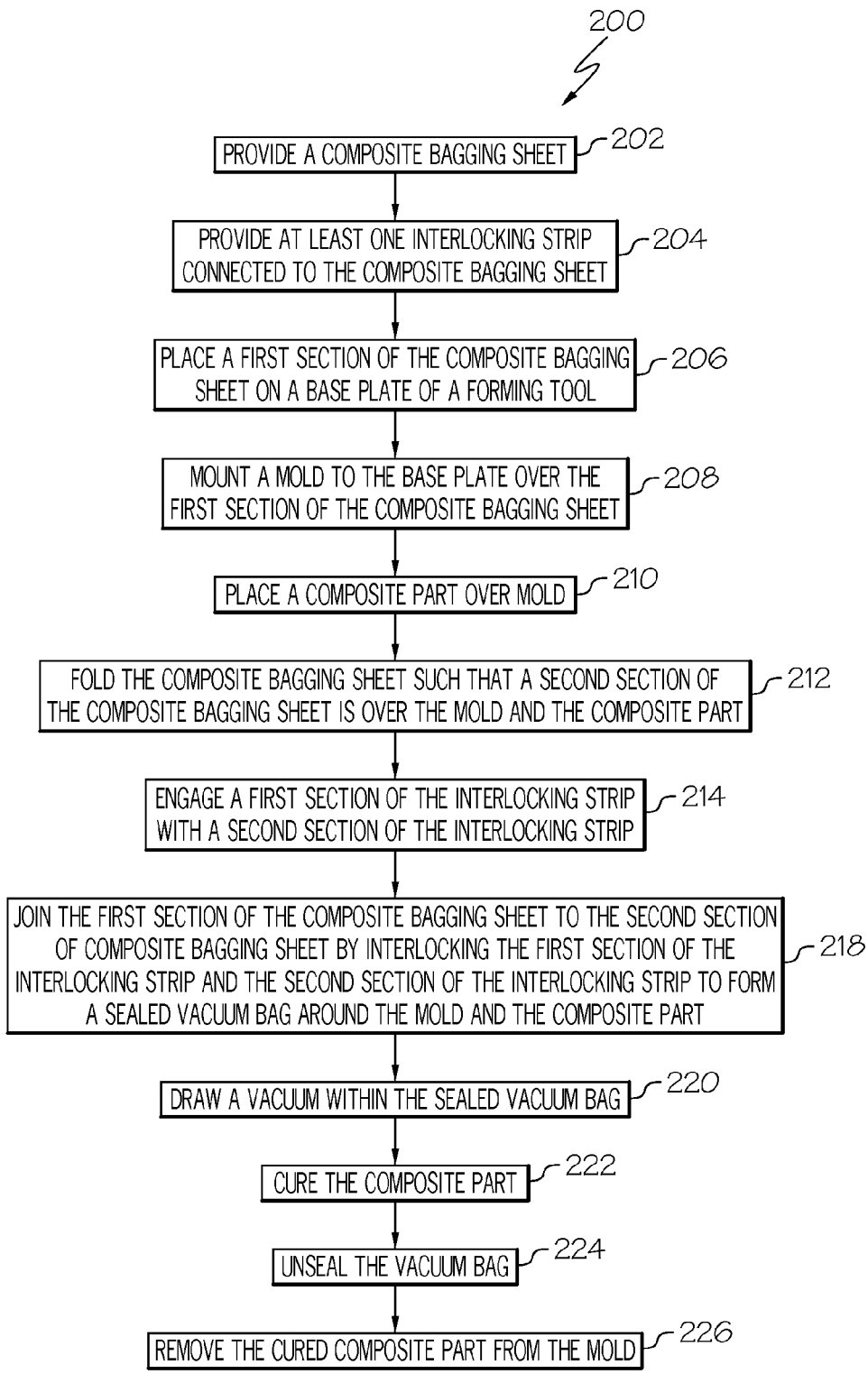
FIG. 9 is a flow chart depicting one embodiment of the disclosed method for vacuum bag sealing.

Referring to FIG. 9 and in reference to FIG. 3, disclosed is one embodiment of a method, generally designated 200, for vacuum bag sealing for composite parts. As shown at block 202, a composite bagging sheet 12 may be provided. As shown at block 204, at least one interlocking strip 14 may be provided along a perimeter edge 20 (FIG. 1) of the composite bagging sheet 12. As shown at block 206, a first section 32 of the composite bagging sheet 12 may be placed on a base plate 42 of a forming tool 40. As shown at block 208, a mold 44 may be mounted to the base plate 42 over top of the first section 32 of the composite bagging sheet 12. As shown at block 210, composite material forming the composite part 38 may be placed on the mold 44. As shown at block 212, the composite bagging sheet 12 may be folded over such that a second section 34 of the composite bagging sheet 12 is placed over the mold 44 and the composite part 38. As shown at block 214, a first section 98 (FIG. 7) of the interlocking strip 14 of the second section 34 of the composite bagging sheet 12 may be aligned and engaged with a second section 100 (FIG. 7) of the interlocking strip 14 of the first section 32 of the composite bagging sheet 12. As shown at block 216, the first section 32 of the composite bagging sheet 12 may be joined to the second section 34 of the composite bagging sheet 12 by interlocking the first section 98 of the interlocking strip 14 with the second section 100 of the interlocking strip 14 to form a sealed vacuum bag 30 around the mold 42 and the composite part 38. As shown at block 218, a vacuum may be drawn on the composite part 38 within the vacuum bag 30. As shown at block 220, the composite part 38 may be cured. As shown at block 222, the vacuum bag 30 may be unsealed by uncoupling the interlocking strip 14 of the second section 34 of the composite bagging sheet 12 from the interlocking strip 14 of the first section 32 of the composite bagging sheet 12. As shown at block 224, the cured composite part 38 may be removed from the mold 44.

Figure 10:
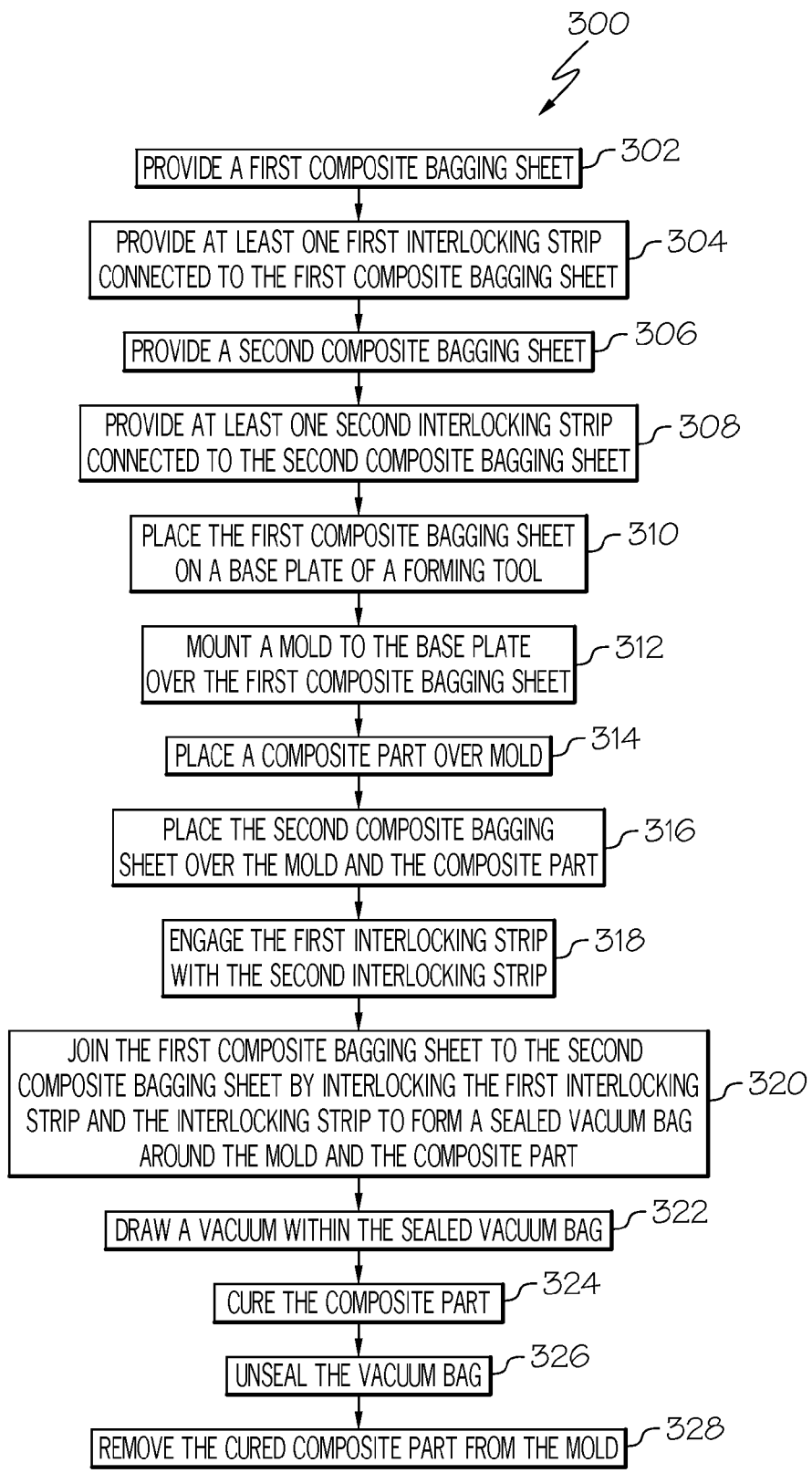
FIG. 10 is a flow chart depicting another embodiment of the disclosed method for vacuum bag sealing.

Referring to FIG. 10 and in reference to FIG. 4, disclosed is another embodiment of a method, generally designated 300, for vacuum bag sealing for composite parts. As shown at block 302, a first composite bagging sheet 52 may be provided. As shown at block 304, at least one first interlocking strip 54 may be provided along a perimeter edge of the first composite bagging sheet 52. As shown at block 306, a second composite bagging sheet 56 may be provided. As shown at block 308, at least one second interlocking strip 58 may be provided along a perimeter edge of the second composite bagging sheet 56. As shown at block 310, the first composite bagging sheet 52 may be placed on a base plate 42 of a forming tool 40. As shown at block 312, a mold 44 may be mounted to the base plate 42 over top of the first composite bagging sheet 52. As shown at block 314, composite material forming the composite part 38 may be placed on the mold 44. As shown at block 316, the second composite bagging sheet 56 may be placed over the mold 44 and the composite part 38. As shown at block 318, the first interlocking strip 54 of the first composite bagging sheet 52 may be aligned and engaged with a second interlocking strip 58 of the second composite bagging sheet 56. As shown at block 320, the first composite bagging sheet 52 may be joined to the second composite bagging sheet 56 by interlocking the first interlocking strip 54 with the second interlocking strip 58 to form a sealed vacuum bag 66 around the mold 42 and the composite part 38. As shown at block 322, a vacuum may be drawn on the composite part 38 within the vacuum bag 66. As shown at block 324, the composite part 38 may be cured. As shown at block 326, the vacuum bag 30 may be unsealed by uncoupling the second interlocking strip 58 of the second composite bagging sheet 56 from the first interlocking strip 54 of the first composite bagging sheet 52. As shown at block 328, the cured composite part 38 may be removed from the mold 44.

Figure 11:
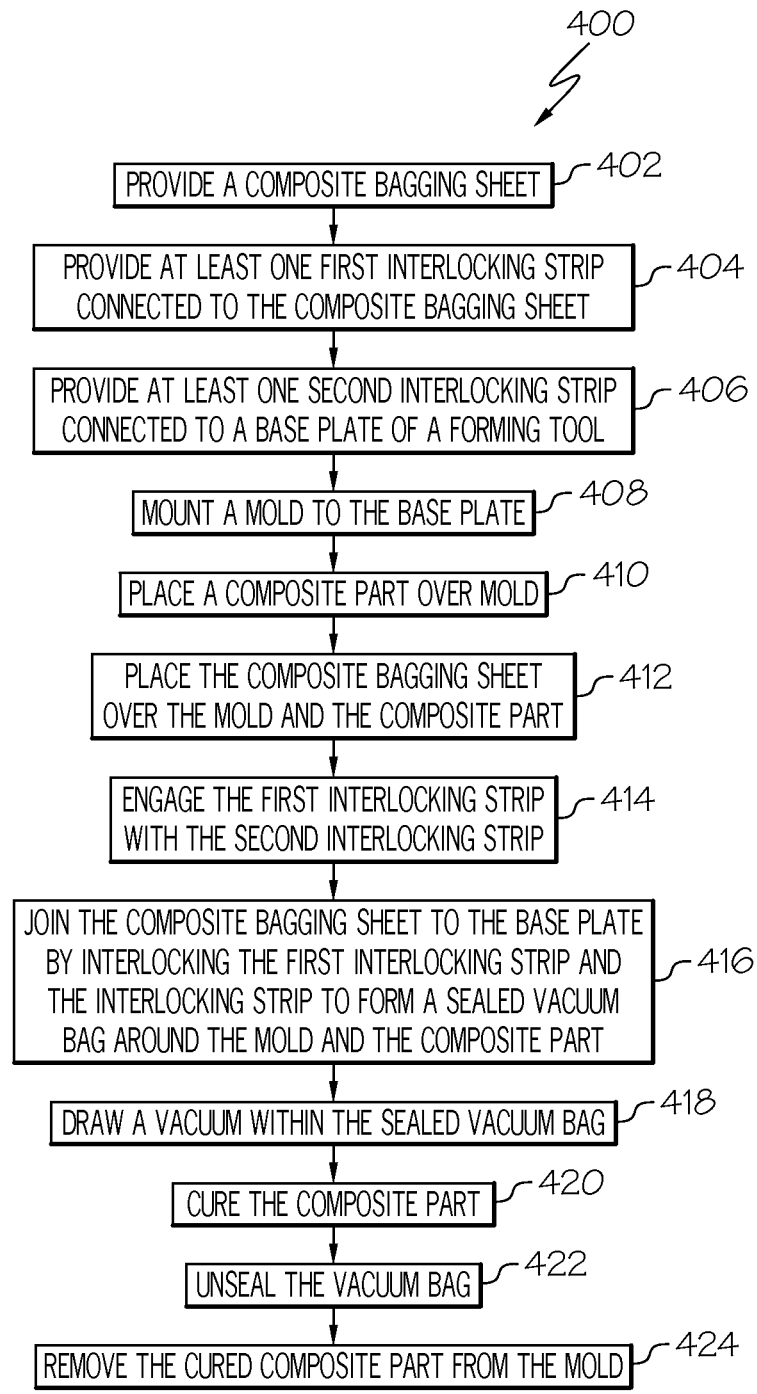
FIG. 11 is a flow chart depicting yet another embodiment of the disclosed method for vacuum sealing.

Referring to FIG. 11 and in reference to FIG. 5, disclosed is yet another embodiment of a method, generally designated 400, for vacuum bag sealing for composite parts. As shown at block 402, a composite bagging sheet 72 may be provided. As shown at block 404, at least one first interlocking strip 74 may be provided along a perimeter edge of the composite bagging sheet 72. As shown at block 406, at least one second interlocking strip 78 may be provided on along a perimeter edge of a base plate 42 of a forming tool 40. As shown at block 408, a mold 44 may be mounted to the base plate 42. As shown at block 410, composite material forming the composite part 38 may be placed on the mold 44. As shown at block 412, the composite bagging sheet 72 may be placed over the mold 44 and the composite part 38. As shown at block 414, the first interlocking strip 74 of the composite bagging sheet 72 may be aligned and engaged with the second interlocking strip 78 of the base plate 42. As shown at block 416, the composite bagging sheet 72 may be joined to the base plate 42 by interlocking the first interlocking strip 74 with the second interlocking strip 78 to form a sealed vacuum bag 83 around the mold 42 and the composite part 38. As shown at block 418, a vacuum may be drawn on the composite part 38 within the vacuum bag 83. As shown at block 420, the composite part 38 may be cured. As shown at block 422, the vacuum bag 83 may be unsealed by uncoupling the first interlocking strip 74 from the second interlocking strip 78. As shown at block 424, the cured composite part 38 may be removed from the mold 44.

Figure 12:
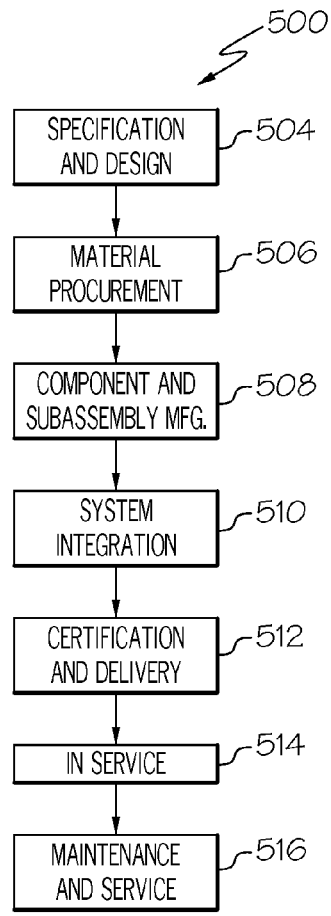
FIG. 12 is flow diagram of an aircraft production and service methodology.
Figure 13:
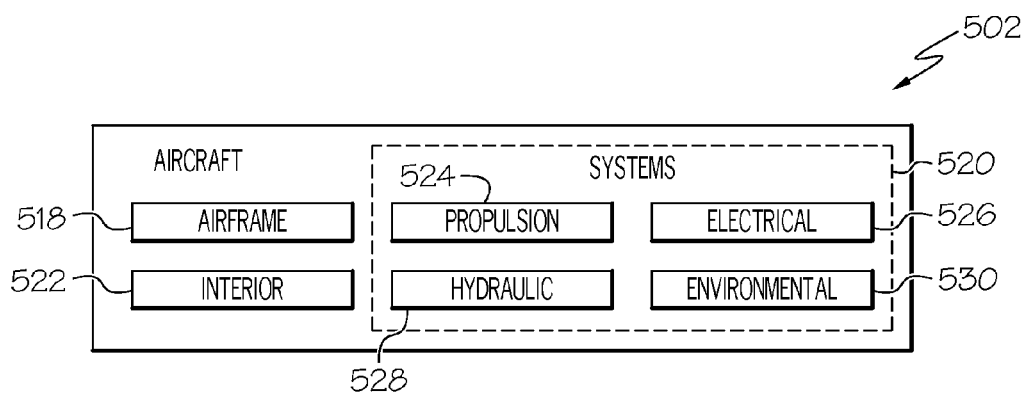
FIG. 13 is a block diagram of an aircraft.

Examples of the disclosure may be described in the context of an aircraft manufacturing and service method 500, as shown in FIG. 12, and an aircraft 502, as shown in FIG. 13. During pre-production, the aircraft manufacturing and service method 500 may include specification and design 504 of the aircraft 502 and material procurement 506. During production, component/subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516, which may also include modification, reconfiguration, refurbishment and the like.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 502 produced by example method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500. For example, components or subassemblies corresponding to component/subassembly manufacturing 508 may be fabricated or manufactured in a manner similar to components or subassemblies produced while the aircraft 502 is in service. Also, one or more apparatus examples, method examples, or a combination thereof may be utilized during component/subassembly manufacturing 508 and/or system integration 510, for example, by substantially expediting assembly of or reducing the cost of an aircraft 502. Similarly, one or more of apparatus examples, method examples, or a combination thereof may be utilized while the aircraft 502 is in service, for example and without limitation, to maintenance and service 516.

Although various embodiments of the disclosed vacuum bag sealing system and method have been shown and described, modifications may occur to those skilled in the art upon reading the specification. The present application includes such modifications and is limited only by the scope of the claims.

What is claimed is:

1. A vacuum bag sealing system comprising:
a composite bagging sheet comprising a sealing surface and a perimeter edge defined by a first lengthwise edge, an opposing second lengthwise edge, a first widthwise edge and an opposing second widthwise edge; and
an interlocking strip connected to said sealing surface of said composite bagging sheet extending along an entirety of said perimeter edge;
wherein said composite bagging sheet is configured to be folded about a central fold line to form a first section of said composite bagging sheet and a second section of said composite bagging sheet, and to position a first portion of said sealing surface and a second portion of said sealing surface facing one another, and
wherein said interlocking strip is configured to join said first section of said composite bagging sheet and said second section of said composite bagging sheet along said entirety of said perimeter edge to form a sealed vacuum bag around a composite part positioned between said first portion of said sealing surface and said second portion of said sealing surface.

2. The system of claim 1 wherein said interlocking strip is bonded to said sealing surface proximate said perimeter edge.

3. The system of claim 1 wherein said interlocking strip comprises a cross-sectional shape, and wherein said cross-sectional shape is configured to interlock a first section of said interlocking strip associated with said first section of said composite bagging sheet and a second section of said interlocking strip associated with said second section of said composite bagging sheet together.

4. The system of claim 1 wherein said interlocking strip comprises a coupling structure, and wherein a first portion of said coupling structure forming a first section of said interlocking strip associated with said first section of said composite bagging sheet is configured to interlock with a second portion of said coupling structure forming a second section of said interlocking strip associated with said second section of said composite bagging sheet.

5. The system of claim 4 wherein:
said coupling structure comprises: a stem extending from said sealing surface of said composite bagging sheet; and a head disposed at a free end of said stem.

6. The system of claim 5 wherein:
said interlocking strip further comprises a base, said stem extending from said base, and
said base comprises a bonding surface, said bonding surface being bonded to said sealing surface of said composite bagging sheet.

7. The system of claim 1 wherein:
said interlocking strip comprises a plurality of elongated coupling structures, wherein said coupling structures are arranged parallel to each other, and
a first portion of said coupling structures forming a first section of said interlocking strip associated with said first section of said composite bagging sheet is configured to interlock with a second portion of said coupling structures forming a second section of said interlocking strip associated with said second section of said composite bagging sheet.

8. The system of claim 7 wherein:
each one of said plurality of coupling structures comprises: a stem extending from said sealing surface of said composite bagging sheet; and a head disposed at a free end of said stem.

9. The system of claim 7 wherein adjacent ones of said plurality of coupling structures forming said first section of said interlocking strip define a groove, and wherein said groove is configured to receive one of said plurality of coupling structures forming said second section of said interlocking strip.

10. The system of claim 1 wherein said interlocking strip is heat welded to said sealing surface of said composite bagging sheet.

11. The system of claim 6 wherein said interlocking strip further comprises a rib extending from said base adjacent to said stem.

12. The system of claim 5 wherein said head of said coupling structure forming said first section of said interlocking strip associated with said first section of said composite bagging sheet and said head of said coupling structure forming said second section of said interlocking strip associated with said second section of said composite bagging sheet are configured to interlock together.

13. The system of claim 5 wherein said head comprises a hook extending outwardly from said free end of said stem.

14. The system of claim 5 wherein said head comprises an opposing pair of hooks extending outwardly from said free end of said stem.

15. The system of claim 8 wherein:
said interlocking strip further comprises a base, said stem of each one of said plurality of coupling structures extending from said base, and
said base comprises a bonding surface, said bonding surface being bonded to said sealing surface of said composite bagging sheet.

16. The system of claim 8 wherein one head of said first portion of said plurality of coupling structures forming said first section of said interlocking strip and an adjacent pair of heads of said second portion of said plurality of coupling structures forming said second section of said interlocking strip are configured to interlock together.

17. The system of claim 8 wherein said head comprises an opposing pair of hooks extending outwardly from said free end of said first portion stem.

18. The system of claim 8 wherein:
said plurality of said coupling structures comprises a first coupling structure and a second coupling structure, located adjacent to said first coupling structure;
said head of said first coupling structure and said head of said second coupling structure, forming said first section of said interlocking strip associated with said first section of said composite bagging sheet, form a groove; and
said groove is configured to receive one of said head of said first coupling structure or said head of said second coupling structure, forming said second section of said interlocking strip associated with said second section of said composite bagging sheet, to interlock said first section of said interlocking strip and said second section of said interlocking strip together.

\* \* \* \* \*